United States Patent
Al-Nuaim et al.

(10) Patent No.: US 10,054,712 B2
(45) Date of Patent: *Aug. 21, 2018

(54) COMPUTER-IMPLEMENTED METHODS FOR RESERVOIR SIMULATION WITH AUTOMATED WELL COMPLETIONS AND RESERVOIR GRID DATA QUALITY ASSURANCE

(71) Applicant: Saudi Arabian Oil Company, Dhahran (SA)

(72) Inventors: Mohammed S. Al-Nuaim, Hofuf (SA);
Umar A. Al-Nahdi, Dammam (SA);
Tareq Al-Zahrani, Dhahran (SA);
Khalid Al-Alwan, Dhahran (SA);
Muath Al-Mulla, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 654 days.

This patent is subject to a terminal disclaimer.

(21) Appl. No.: 14/584,184

(22) Filed: Dec. 29, 2014

(65) Prior Publication Data
US 2015/0185361 A1    Jul. 2, 2015

Related U.S. Application Data

(60) Provisional application No. 61/921,943, filed on Dec. 30, 2013, provisional application No. 61/921,966, filed on Dec. 30, 2013.

(51) Int. Cl.
*G06G 7/48*     (2006.01)
*G01V 11/00*    (2006.01)
(Continued)

(52) U.S. Cl.
CPC .............. *G01V 11/00* (2013.01); *G01V 1/003* (2013.01); *G01V 99/00* (2013.01); *G01V 99/005* (2013.01); *G01V 2200/14* (2013.01)

(58) Field of Classification Search
CPC ... G01V 99/005; G01V 2200/14; G01V 11/00
(Continued)

(56) References Cited

U.S. PATENT DOCUMENTS 4,313,164 A     1/1982 Regat
5,757,663 A *   5/1998 Lo .......................... E21B 49/00
                                                    702/12
(Continued)

FOREIGN PATENT DOCUMENTS

EP     2631685 A2     8/2013
WO     0123829 A2     4/2001
(Continued)

OTHER PUBLICATIONS

Reservoir_engineer, '#3, Thread: How to Quality Check a Static Model'. In Petroleum Community Forum: Petroleum Industry Zone: Reservoir [online], Mar. 1, 2011; 03:34 PM [retrieved on May 10, 2017]. Retrieved from the Internet: <URL: http://www.egpet.net/vb/threads/44705-How-to-Quality-Check-a-Static-Model#axzz4ghCm2U4I >; 5 pp.*

(Continued)

*Primary Examiner* — Hugh Jones
(74) *Attorney, Agent, or Firm* — Bracewell LLP; Constance G. Rhebergen; Christopher L. Drymalla

(57) ABSTRACT

Machine, computer readable medium, program code, and computer-implemented methods for performing a reservoir simulation with well completion and reservoir grid data quality assurance, are provided. An exemplary embodiment can include a data quality analyzing machine having memory containing data quality analyzing instructions configured to simulate a reservoir model with automated well completion and reservoir grid data quality assurance.

19 Claims, 10 Drawing Sheets

(51) Int. Cl.
*G01V 1/00* (2006.01)
*G01V 99/00* (2009.01)

(58) Field of Classification Search
USPC .......................................................... 703/10
See application file for complete search history.

(56) References Cited

U.S. PATENT DOCUMENTS

| | | | |
|---|---|---|---|
| 5,905,657 | A | 5/1999 | Celniker |
| 6,078,869 | A | 6/2000 | Gunasekera |
| 6,106,561 | A | 8/2000 | Farmer |
| 6,138,076 | A | 10/2000 | Graf et al. |
| 6,317,695 | B1 * | 11/2001 | Zhou ....................... G01V 1/28 702/16 |
| 6,480,790 | B1 | 11/2002 | Calvert et al. |
| 6,675,101 | B1 | 1/2004 | Shray et al. |
| 7,542,037 | B2 | 6/2009 | Fremming |
| 7,660,711 | B2 | 2/2010 | Pita et al. |
| 7,739,089 | B2 | 6/2010 | Gurpinar et al. |
| 7,805,283 | B2 | 9/2010 | Zangl et al. |
| 7,986,319 | B2 | 7/2011 | Dommisse et al. |
| 7,996,198 | B2 | 8/2011 | Swanson et al. |
| 8,150,669 | B2 | 4/2012 | Cacas et al. |
| 8,214,187 | B2 | 7/2012 | Mouton et al. |
| 2007/0016389 | A1 | 1/2007 | Ozgen |
| 2008/0179094 | A1 | 7/2008 | Repin et al. |
| 2009/0254325 | A1 * | 10/2009 | Gokdemir ............... E21B 49/00 703/10 |
| 2010/0076740 | A1 | 3/2010 | Kuchuk et al. |
| 2010/0191516 | A1 | 7/2010 | Benish et al. |
| 2011/0054857 | A1 | 3/2011 | Moguchaya |
| 2011/0191029 | A1 * | 8/2011 | Jalali .................... E21B 49/087 702/6 |
| 2012/0136636 | A1 * | 5/2012 | Kleine ................. G01V 99/005 703/2 |
| 2012/0253770 | A1 | 10/2012 | Stern et al. |
| 2013/0096896 | A1 | 4/2013 | Al-Shahri |
| 2013/0096897 | A1 | 4/2013 | Shahri |

FOREIGN PATENT DOCUMENTS

| | | |
|---|---|---|
| WO | 2010053618 A1 | 5/2010 |
| WO | 2012085159 A2 | 6/2012 |

OTHER PUBLICATIONS

International Search Report with Written Opinion issued in related PCT application PCT/US2014/072689; dated May 8, 2015; 13 pages.

International Search Report with Written Opinion issued in related PCT application PCT/US2014/072703; dated Apr. 9, 2015; 13 pages.

Norsk Regnesentral, "COHIBA user manual—Version 2.0", 2010, pp. 1-24, http://www.nr.no/en/nrpublication?query=/file/5222/Almendral_Vazquez_-_COHIBA_user_manual_-_Version_2.pdf.

L. Roncaglia et al., "Integrated Workflow for Modeling Basin-Scale Petroleum Systems: Applications to the Kupe Area, Taranaki, New Zealand", SPE Annual Technical Conference and Exhibition held in Florence Italy, 2010, pp. 1-26, SPE 133903.

M. Ehtesham Hayder et al., "Designing a High Performance Computational Platform for Simulation of Giant Reservoir Models" Saudi Aramco Journal of Technology, 2013, pp. 56-67.

Jack Bouska et al., "Validating Reservoir Models to Improve Recovery" Oilfield Review, 1999, pp. 21-35.

* cited by examiner

COMPUTER-IMPLEMENTED METHODS FOR RESERVOIR SIMULATION WITH AUTOMATED WELL COMPLETIONS AND RESERVOIR GRID DATA QUALITY ASSURANCE

RELATED APPLICATIONS

The present application is a non-provisional application which claims priority to and the benefit of U.S. Provisional Application No. 61/921,943, filed on Dec. 30, 2013 and titled "Automated Well Completions and Reservoir Grid Data Quality Assurance Methods For Reservoir Simulation," and U.S. Provisional Application No. 61/921,966, filed on Dec. 30, 2013 and titled "Automated Well Completions and Reservoir Grid Data Quality Assurance Apparatus and Computer Readable Medium For Reservoir Simulation," the disclosures both of which are incorporated herein in their entireties. This application is also related to U.S. patent application Ser. No. 14/584,665, titled "Machines For Reservoir Simulation With Automated Well Completions and Reservoir Grid Data Quality Assurance" and filed this same day, the contents of which are incorporated herein by reference in its entirety.

BACKGROUND OF THE INVENTION

Field of the Invention

This invention generally relates to reservoir simulation, and more particularly to computer-implemented methods for reservoir simulation with well completions and reservoir data quality assurance.

Description of the Related Art

During the production life cycle of oil and gas extracted from reservoir fields in geological formations, certain stages are followed which include exploration, appraisal, reservoir development, production decline, and abandonment of the reservoir. During this lifecycle, massive amounts of data are collected, such as seismic, well logs, core data, and production data which represent raw data. In addition, during the life of field development, several disciplines develop studies and understandings directed to different part of the reservoir. For example, geologists and geo-physicists develop structure, geological horizons, and geological models for the reservoir. Petro-physicists develop initial saturation and oil-in-place maps. Reservoir engineers provide field development plans. The raw and interpreted data are integrated in a cumbersome process in order to construct reservoir simulation models.

Analytic tools do not yield meaningful results for complicated reservoirs or reservoir fluids. The influence of rock properties of the reservoir and fluid properties on hydrocarbon recovery can be captured by using reservoir simulation. Reservoir simulation is a comprehensive framework to optimize the production of oil and gas fields. Many key questions about the optimum development scheme for a particular reservoir can be answered by performing simulations after carefully characterizing the reservoir.

In order to yield meaningful results, reservoir simulation engineers have to go through an intense and time consuming process to manually quality check large amounts of data which can consist of wells, logs, and completion events for as many as 50 or more years of history.

Recognized by the inventors is that it is fundamental that data used in building reservoir simulation models be quality controlled and cross-checked to eliminate inconsistencies and problems during the history match process. Also, recognized is the need for a simulation data quality workflow design and software package that guides engineers through the quality checking process as the first stage of simulation model construction.

SUMMARY OF THE INVENTION

In view of the foregoing, various embodiments of the present invention include systems, program code, computer readable media, and methods which provide for a simulation data quality workflow design and software packages that guides engineers through the quality checking process as the first stage of simulation model construction. Various embodiments of the present invention advantageously provide workflow processes and software/program product that cover important data required for building simulation models. The preparation and validation of the data is conducted using tailored automated workflows that beneficially guide engineers through the quality control steps in a streamlined manner. According to one or more embodiments, at every important step, specific data can be reviewed and validated based on well-developed quality control (QC) criteria. In case of any inconsistencies, the workflow or software/program product can issue relevant error and warning messages and recommends possible remedial solutions or actions.

Building reservoir simulation models is a challenging and tedious task due to the fact that simulation models are an integration of all collected geological and engineering multidisciplinary data. Reservoir simulation engineers have to go through an intense and time consuming process to manually quality check large amounts of data which consist of wells, logs and completion events for upwards of 50 years or more of history. Various embodiments of the invention provide a methodology of quality checking data used in building reservoir simulation models and checking the data to eliminate inconsistencies and problems during the history match process. The methodology can include nine workflows.

Various embodiments of the invention include a machine adapted to simulate a three-dimensional (3D) reservoir model on one or more displays. The machine can include one or more processors and tangible computer-readable medium. The medium can have a set of instructions stored therein that cause the one or more processors to initiate a plurality of modules to create reservoir data and to transform the reservoir data so as to simulate a 3D reservoir model on the one or more displays. For example, embodiments can include a seismic survey module to collect and process data from a seismic survey. The seismic survey module can work in conjunction with seismic wave generators and seismic wave receivers to compile seismic data and process seismic data to provide data and information on a reservoir. The seismic wave generators can include explosives, vehicle-mounted weights, and other seismic wave generators as known by those skilled in the art. Likewise, the seismic wave receivers can include geophones, hydrophones, and other seismic wave receivers as known by those skilled in the art. The reservoir data can include the location of well tops, grid horizons, and well trajectory positions. Embodiments can further include a well top location module to access well top location data describing a well top location of a number of well tops for a reservoir simulation model, and a well trajectory position module to access well trajectory position data describing a well trajectory position for a number of well trajectories. In embodiments, the various functions and steps disclosed herein are executed by a plurality of dedicated modules.

To ensure correct modeling of a plurality of grid horizons, embodiments can include a grid horizon automated validation module. This module can perform an automated validation of a grid horizon location for each of a number of grid horizons against a number of well top locations associated with the respective grid horizon. The automated validation of grid horizons can include comparing the grid horizon location with the well top location of each well top associated with the grid horizon. To ensure correct modeling of well trajectories, embodiments can include a well trajectory automated verification module. This module can perform an automated verification of well trajectory position for each of a number of well trajectories against the well top locations of a set of at least two well top locations associated with the respective well top trajectory. In embodiments, each well top location defines an entry position of an associated well through a corresponding geologic layer, and each set of at least two well top locations defines the well trajectory position of the well trajectory of the associated well extending between the at least two well top locations. The automated verification of well trajectory position can include comparing the well trajectory position with the well top locations for each of the respective associated sets of at least two well top locations. Embodiments can include a reservoir simulation module to integrate the reservoir data, grid horizons, and well trajectories thereby to simulate a 3D reservoir model on the one or more displays.

Various embodiments of the invention include a computer implemented method of providing automated well completion and reservoir grid data quality assurance for a reservoir simulation. As noted, the steps disclosed may be executed by a plurality of dedicated modules as according to embodiments of the machine disclosed herein. According to an aspect of the invention, an exemplary method includes the steps of: validating a grid index order of grids used in modeling a reservoir by validating an associated grid cell number assignment of a reference grid, validating a grid location by comparison of its location with a well-known location of a well, validating grid horizons against well tops to ensure correct modeling of the grid horizons, validating model grid fault lines positioning against interpreted fault lines positioning to ensure that associated grid faults are modeled correctly, identifying and highlighting, or flagging, grids having issues with either cell angle, cell bulk volume, cell volume contrast, or flipped cells, that significantly negatively impact simulation convergence and simulation computing time, verifying well trajectories are correctly located by comparing them with corresponding sets of well top locations and by identifying whether they intersect their assigned perforation events, verifying well completions are correctly located by identifying whether they share a same depth zone as assigned perforation events, and by comparing their location with a certain well log depth zone associated with well log data indicating the location of the respective well completion, and validating well completion events temporally with observed liquid flow rate data.

According to another aspect, an exemplary method can include one or more of the steps described below. The steps can include receiving simulation grid cell data for each of a plurality of simulation grid cells, simulation grid cell data for each of the plurality of simulation grid cells, and a well-known location of one or more of the plurality of wells, performing an automated validation of simulation grid index order, and performing an automated validation of grid cell location against the well-known location of one or more of the plurality of wells. The simulation grid cell data include three-dimensional grid cell number assignments. The simulation grid cell data can include a modeled location of each of the plurality of simulation grid cells. The automated validation of the simulation grid cell index order can include comparing the three-dimensional grid cell number assignment of the top left simulation grid cell of the model with a reference grid cell assignment number. The automated validation of the grid cell location can include comparing the modeled simulation grid cell location with the well-known location of one or more of the plurality of wells performed for each of the plurality of simulation grid cells to ensure proper grid cell positioning.

The steps can include positioning a plurality of seismic wave generators and a plurality of seismic wave receivers in operable proximity to a reservoir location, generating one or more seismic waves responsive to the plurality of seismic wave generators, compiling seismic survey data responsive to received waves of the plurality of seismic wave receivers, and processing the seismic survey data thereby to convert the seismic survey data into reservoir data, the reservoir data including at least well top location data, grid horizon data, and well trajectory position data. embodiments can include a seismic survey module to collect and process data from a seismic survey. The seismic survey module can work in conjunction with seismic wave generators and seismic wave receivers to compile seismic data and process seismic data to provide data and information on a reservoir. The seismic wave generators can include explosives, vehicle-mounted weights, and other seismic wave generators as known by those skilled in the art. Likewise, the seismic wave receivers can include geophones, hydrophones, and other seismic wave receivers as known by those skilled in the art. The reservoir data can include the location of well tops 43, grid horizons, and well trajectory positions. Embodiments can further include a well top location module to access well top location 43 data describing a well top location 43 of a number of well tops for a reservoir simulation model, and a well trajectory position module to access well trajectory 61 position data describing a well trajectory position for a number of well trajectories 61.

The steps can also include receiving well top location 43 data describing a well top location of each of a plurality of well tops for a reservoir simulation model, and performing an automated validation of a grid horizon location of each of a plurality of grid horizons against the well top location of one or more of the plurality of well tops associated with the respective grid horizon. The well top location of respective associated one or more well tops identifies the depth of a geological layer corresponding with the respective grid horizon. The automated validation of the grid horizon locations can include comparing the grid horizon location with the well top location of each respective associated one or more well tops for each of the plurality of grid horizons to ensure correct modeling of the plurality of grid horizons, and identifying and highlighting, or flagging, each of the plurality of well tops having their respective well top location being separated from the grid horizon location corresponding therewith by more than a preselected tolerance.

The steps can also or alternatively include accessing modeled grid fault lines data and interpreted grid fault lines data for each of one or more grid fault lines, and performing an automated validation of modeled grid fault line positioning against interpreted grid fault line positioning. The modeled grid fault lines data describes modeled grid fault line positioning for each of a plurality of grid faults and the interpreted grid fault lines data describing interpreted grid fault line positioning for each of the plurality of grid faults. The automated validation of the model grid line positioning can include comparing the modeled grid fault line positioning with the interpreted grid fault line positioning for each of the plurality of grid faults to determine whether or not the respective modeled grid fault line intersects its corresponding interpreted grid fault line to ensure that the plurality of grid faults are correctly modeled.

The steps can also or alternatively include receiving simulation grid cell data for each of a plurality of simulation grid cells, and performing an automated identification and highlighting of each of the plurality of simulation grid cells having out of tolerance cell attributes, such as, for example, cell angle, cell bulk volume, cell volume contrast, and/or flipped cells that significantly negatively impact simulation convergence and simulation computing time.

The steps can also or alternatively include receiving well trajectory position data describing a well trajectory position of each of a plurality of well trajectories, and performing an automated verification of the well trajectory position of each of the plurality of well trajectories against the well top locations of a set of at least two of the plurality of well top locations associated with the respective well trajectory. Each well top location identifies an entry position of an associated well of the plurality of wells through a corresponding geologic layer. The sets of at least two well top locations identify the well trajectory position of the well trajectory of the associated well extending therebetween. The automated verification of the well trajectory position can include comparing the well trajectory position with the well top locations of each of the respective associated set of at least two well top locations for each of the plurality of well trajectories to ensure the plurality of well trajectories are correctly located, and identifying each of the plurality of well trajectories having their respective well trajectory position being separated from a trajectory extending through the at least two well top locations corresponding therewith by more than a preselected tolerance.

The steps can also or alternatively include receiving the well trajectory position data and grid perforation location data describing a grid perforation location of each of a plurality of grid perforation events, and performing an automated verification of the well trajectory position of the each of the plurality of well trajectories against the grid perforation location of one or more associated grid perforation events of the plurality of grid perforation events. Each grid perforation event can identify a location of a portion of an associated well of the plurality of wells. This automated verification of the well trajectory position can include comparing the well trajectory position with the grid perforation location of an associated one of the plurality of perforation events for each of the plurality of well trajectories to ensure that the respective plurality of well trajectories are correctly located, and identifying each of the plurality of well trajectories that do not intersect with the respective grid perforation event associated therewith.

The steps can also or alternatively include receiving well completion location data describing the well completion location of each of the plurality of well completions for each of the plurality of wells, and production logging tool data containing production zone information for each of the plurality of wells, and performing an automated verification of the well completion event location of each of the plurality of well completions against the production logging tool data, the well completion location data identifying one or more depth zones for each of the plurality of well completions. The production logging tool data contains saturation information for each of a plurality of consecutive well log depth zones for each of the plurality of wells. The automated verification can include comparing the one or more depth zones of the well completion event of one of the wells with the well log depth zones for the corresponding well having a saturation level indicating existence of a flowing production zone, performed for each of the plurality of wells to ensure that the well completion location for each of the plurality of wells honors related production logging tool data.

The steps can also or alternatively include receiving observed liquid flow rate data and well opening and closing for production data for the plurality of wells, and performing an automated validation the plurality of well completion events temporally against observed liquid flow rate data. The observed liquid flow rate data includes liquid flow rate measurements for each of a plurality of time periods for each of the plurality of wells. The automated temporal validation of the plurality of well completion events can include comparing times of opening and closure of each of the plurality of wells for production with liquid flow rate measurements taken between the respective times of opening and closure of the respective well for production for each of the plurality of wells to ensure that the well completion events are correctly assigned.

Various embodiments of the invention include program code for programming one or more processors to perform operations for providing automated well completion and reservoir grid data quality assurance for a reservoir simulation, which is stored on a non-transitory computer readable medium. An exemplary program code includes a set of instructions that when executed by one or more processors, cause the one or more processors to perform any or all of the steps, described above.

Various embodiments of the invention include non-transitory computer readable medium or media to provide providing automated well completion and reservoir grid data quality assurance for a reservoir simulation. An exemplary non-transitory computer readable medium embodies processor readable code that includes a set of instructions, that when executed by one or more processors, cause the one or more processors to perform operations which perform any or all of the steps, described above.

Various embodiments of the invention include a machine for providing automated well completion and reservoir grid data quality assurance for a reservoir simulation. An exemplary machine can include a data quality analyzing computer including one or more processors and memory in communication with the one or more processors, and data quality analyzing program code stored in the memory of the data quality analyzing computer to guide users through a quality checking process. The program code includes instructions that when executed by the one or more processors cause the one or more processors to perform operations which perform any or all of the steps, described above. Advantageously, the machine may comprise a server.

Advantageously, one or more embodiments of the invention provide systems, program code and workflows/methods eliminate tedious manual non-formal effort, and provide high-quality simulation models checked and rechecked through formal and automated workflows. Advantageously, the new workflows/program code and methods can reduce the checking process from months to a few days. The pre-checking of data according to the systems, program code and workflows/methods can significantly reduce the overall time to perform history matching. The workflows/methods steps can advantageously allow simulation engineers to easily validate the Grid and Well Completion-related data.

The systems, program code and workflows/methods can advantageously assist in improving the quality, enforce best practices, and reduce the turnaround time required for building and conducting reservoir simulation studies. The invention embodiments can allow reservoir engineers to highlight reservoir grid and well completions data inconsistencies that come from different sources.

By using the automated reservoir grid and well completions data workflows/methods, reservoir engineers can easily validate the simulation related data that can advantageously reduce the time spent in history matching process and will lead to more accurate representing reservoir model, which can lead to better prediction of gas/oil production. This tool or tools can advantageously reduce the time spent in quality checking simulation related data from months to days.

One or more embodiments advantageously provide simulation engineers with quality control steps that streamline workflows, software automation of grid and well completions workflows, highlighting of all the simulation model data inconsistencies and issuing of warning message and proper actions to resolve the relevant errors, and/or enforcement of reservoir simulation best practices by preventing the user to proceed further without finishing the current quality control step successfully but with the flexibility for the user to activate the next quality control step by providing a proper business and technical justification.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
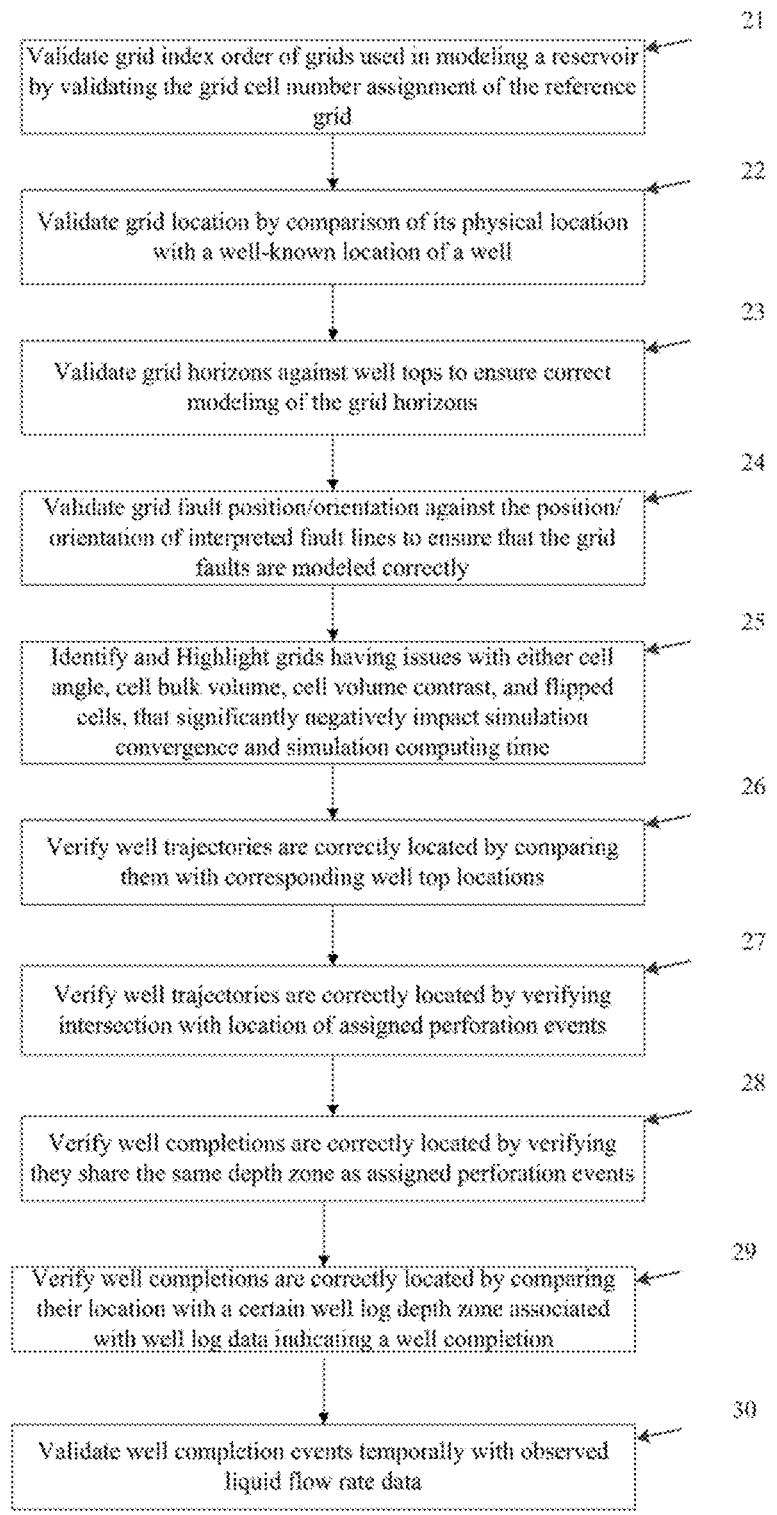
FIG. 1 is a block flow diagram illustrating a high level flow diagram of a process/tool for performing well completion and reservoir grid data quality assurance for a reservoir simulation according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Reservoir simulation is a comprehensive framework to optimize the production of oil and gas fields. The influence of rock properties of the reservoir and fluid properties on oil recovery can be captured by using reservoir simulation. Analytic tools have not been found to yield meaningful results for complicated reservoirs or reservoir fluids. In contrast, many key questions about the optimum development scheme for a particular reservoir can be answered by performing simulations after carefully characterizing the reservoir.

Building reservoir simulation models can be a challenging and tedious task due to the fact that simulation models are an integration of all collected geological and engineering multidisciplinary data. Conventionally, reservoir simulation engineers must work through an intense and time consuming process to quality check large amounts of data which includes wells, logs, and completion events for as many as 50 years or more of history. It is fundamental that data used in building reservoir simulation models needs to be quality controlled and cross-checked to eliminate inconsistencies and problems during the history match process.

Various embodiments of the invention beneficially include simulation data quality workflow design apparatus/systems, program code, and workflows/methods that guides engineers through the quality checking process as the first stage of simulation model construction. According to various embodiments, the designed workflow/software covers some data required for building simulation models. According to various embodiments, the preparation and validation of data is conducted using tailored automated workflows that guide engineers through quality control (QC) steps in a streamlined manner. Specific data can be reviewed and validated at every important step, based on well-developed QC criteria. In case of any inconsistencies, the workflow or software/program product can issue relevant error and warning messages and recommends possible remedial solutions or actions. The systems, program code, and workflows/methods can eliminate tedious manual non-formal effort and can beneficially result in high-quality simulation models checked and rechecked through formal and automated workflows, reducing the process from months to a few days, and through the enhanced pre-checking of data, can reduce the overall time to perform history matching.

Various embodiments of the invention provide systems, program code and workflows/methods. An exemplary workflow includes nine major QC steps that allow simulation engineers to easily validate the grid and well completion related data, including but not limited to, grid position/orientation, grid origin, flipped cells, grid horizon, well trajectories and completions, and faults position/orientation.

The steps can include positioning a plurality of seismic wave generators 10 and a plurality of seismic wave receivers 16 in operable proximity to a reservoir location, generating one or more seismic waves responsive to the plurality of seismic wave generators, compiling seismic survey data responsive to received waves 30, 32 of the plurality of seismic wave receivers 16, and processing the seismic survey data thereby to convert the seismic survey data into reservoir data, the reservoir data including at least well top location data, grid horizon data, and well trajectory position data.

FIG. 1 provides a flow diagram illustrating exemplary steps of an exemplary process/tool for performing well completion and reservoir grid data quality assurance for a reservoir simulation. The high-level steps can include validating the grid indexed order of grids (block 21), validating grid locations (block 22), validating grid horizons (block 23), validating grid fault position/orientation (block 24), identifying and highlighting grids having issues (block 25), verifying well trajectories are correctly located (blocks 26 and 27), verifying well completions are correctly located (blocks 28 and 29), and validating well completion events (block 30). Note, although provided in a certain order, as would be recognized by one of ordinary skill in the art, not all steps need to be performed in the exemplary order listed, as would be understood by one of ordinary skill in the art.

Figure 2:
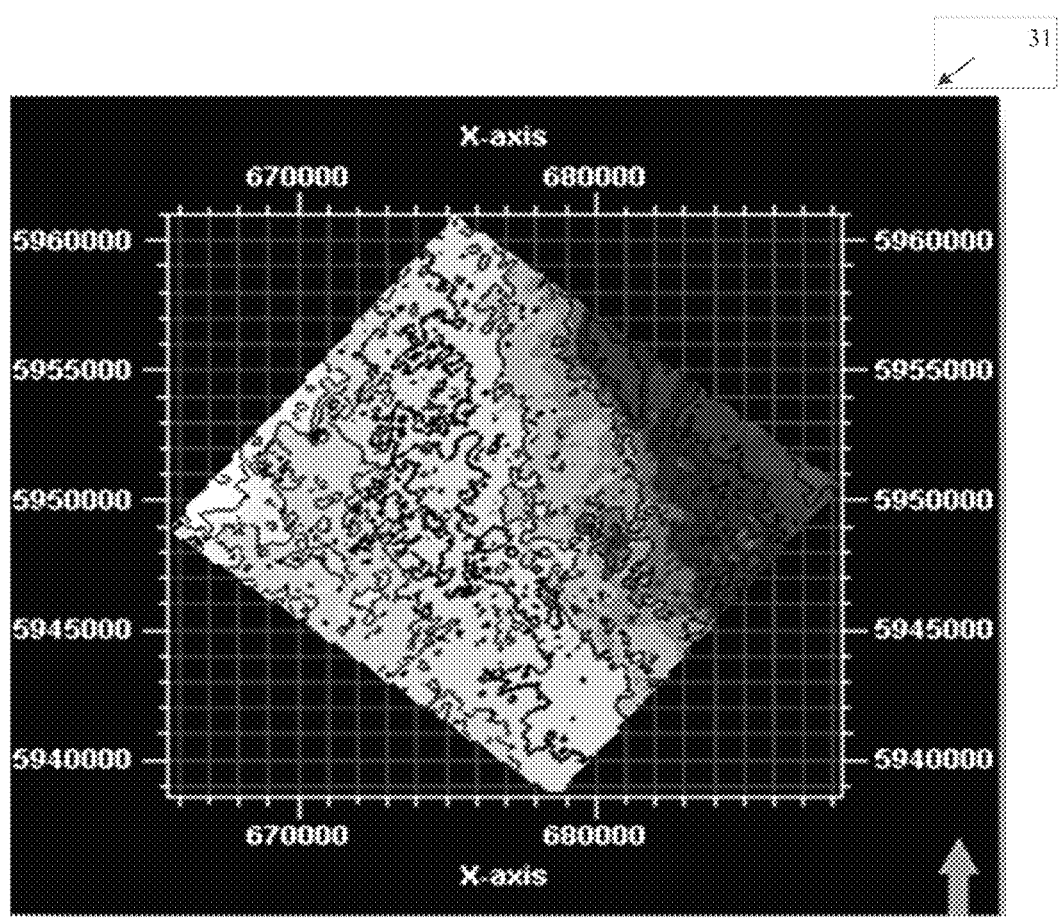
FIG. 2 is a graphic illustrating a grid cell presented by an exemplary apparatus shown to illustrate validation of grid index order according to an embodiment of the present invention.

Referring also to FIG. 2, according to the exemplary embodiment, in the first listed step (block 21, FIG. 1), the tool will validate the grid index order of grid cells 31 used in modeling a reservoir automatically, for example, by validating the grid cell number assignment of the reference grid cell (e.g., validating whether or not the top left cell is at or assigned (1,1,1)). The process/tool will then validate the grid cell location (block 22), for example, by importing data for a well-known location well and comparing the grid cell location with the location of the location well.

Figure 3:
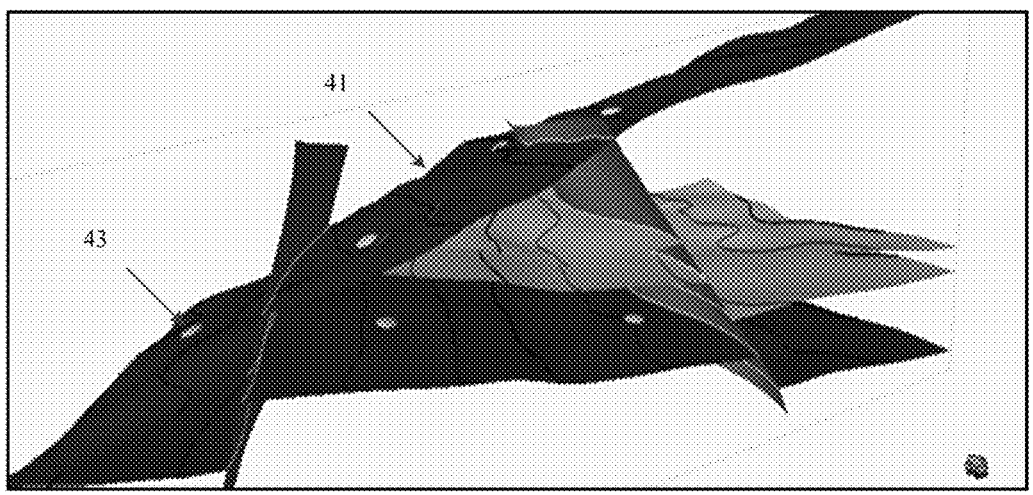
FIG. 3 is a graphic illustrating grid horizons shown aligned with a set of well tops shown to illustrate validation of grid horizons location according to an embodiment of the present invention.

Referring to FIG. 3, the process/tool can also or alternatively validate the grid horizons location 41 against well tops 43, automatically, to ensure correct modeling of the grid horizons (block 23, FIG. 1). The well tops 43 mark/identify the depth of the upper boundary of the geological layer. All of the well tops 43 should intersect with the grid horizons 41. According to an exemplary configuration, the tool can allow the simulation engineers to select (e.g., preselect) a threshold distance value to establish a criteria of whether or not the well tops will be considered as intersecting or failing to intersect the respective grid horizons 41. As such, the tool can beneficially provide a statistics results of how many well tops 43 have a distance more than the assigned threshold for each grid horizon 41. Also, the tool can display all the well tops 43 that do not intersect with grid horizons 41 in three-dimensions.

Figure 4A:
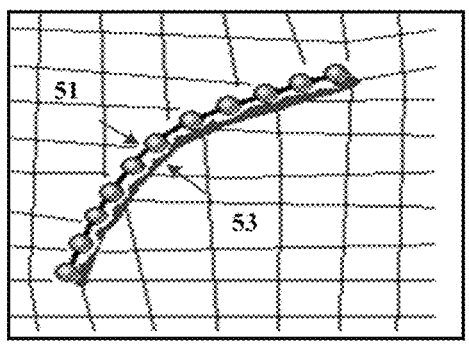
FIGS. 4A-4C are a set of graphs illustrating interpreted fault lines overlaid with corresponding grid faults shown to illustrate validation of grid fault position according to an embodiment of the present invention.
Figure 4B:
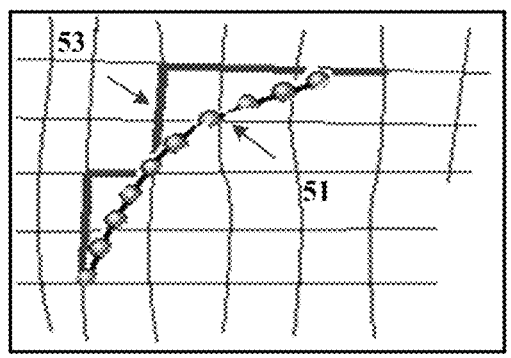
Figure 4C:
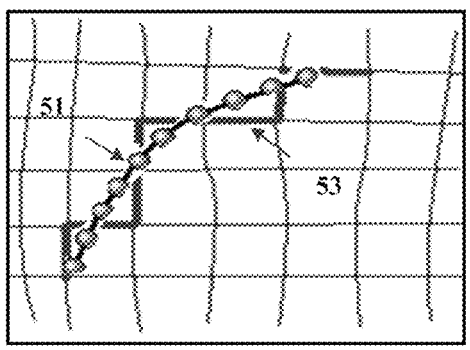

Referring to FIGS. 4A-4C, the process/tool can also or alternatively validate grid fault position/orientation against the position/orientation of interpreted fault lines 51 (block 24, FIG. 1) to ensure that the grid faults 53 are modeled correctly. All of the grid faults 53 should intersect with the imported interpreted faults 51. According to the exemplary configuration, the tool can allow the simulation engineers to select (e.g., preselect) a threshold distance to establish a criteria of whether or not the grid fault position/orientation matches that of interpreted fault lines 51. The tool can also provide statistical results of how many grid faults 53 have a distance greater than the assigned threshold distance between themselves and the imported interpreted fault lines 51. Additionally, the tool can display all the grid faults 53 that do not intersect with the imported faults 51, in three dimensions.

Figure 5:
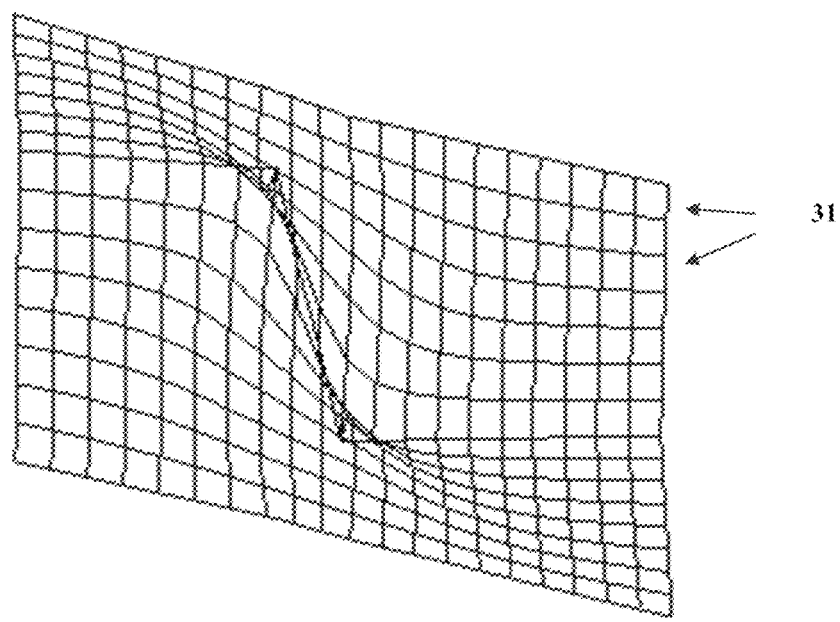
FIG. 5 is a graphical display of a sheet of reservoir grid cells including flipped grid cells to illustrate identification of cells having angle, volume, contrast, or reverse positioning issues according to an embodiment of the present invention.

The process/tool can also or alternatively identify and highlight grids having issues with cell angle, cell bulk volume, cell volume contrast, and/or flipped cells (cells that are inside out), that significantly negatively impact simulation convergence and/or simulation computing time (block 25, FIG. 1). As shown in FIG. 5, for example, according to the exemplary configuration, the tool will display cells with issues in three dimensions based on threshold values selected (e.g., preselected) for each of the above parameters by the simulation engineers based upon the desired level of acceptable negative impact upon the simulation convergence and/or computing time, as would be understood by one of ordinary skill in the art.

Figure 6:
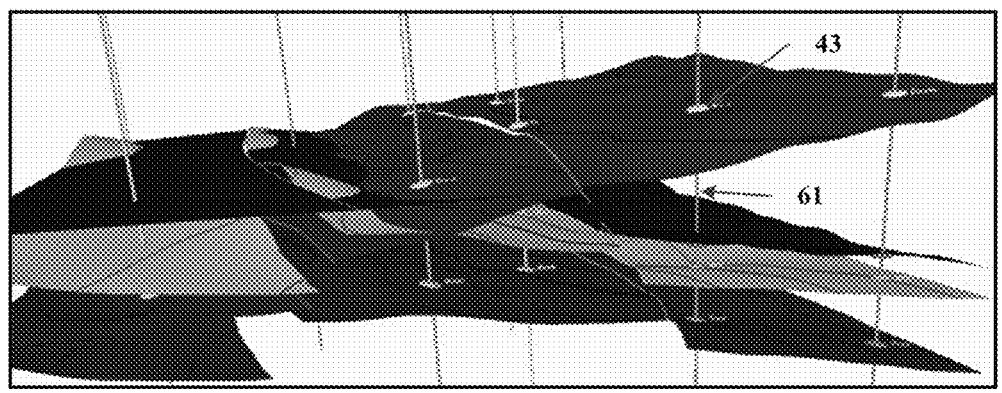
FIG. 6 is a graphic illustrating well trajectories shown aligned with a set of well tops shown to illustrate verifying correct well trajectory location according to an embodiment of the present invention.

Referring to FIG. 6, the process/tool can also or alternatively verify well trajectories 61 are correctly located by comparing them with corresponding well top locations 43, e.g., typically three to ensure alignment (block 26, FIG. 1). According to the exemplary configuration, the well trajectories 61 should intersect each of the well top locations 43 within selected (e.g., preselected) tolerances or other criteria as understood by one of ordinary skill in the art. The tolerances can be based on a threshold distance value provided by the simulation engineer. The tool can also provide statistical results showing how many well trajectories 61 have a distance from an associated well top location 43 of more than the preselected threshold value. Additionally, according to the exemplary configuration, any of the well trajectories 61 with alignment issues such as, for example, those exceeding preselected tolerances, can be displayed in three dimensions.

Figure 7:
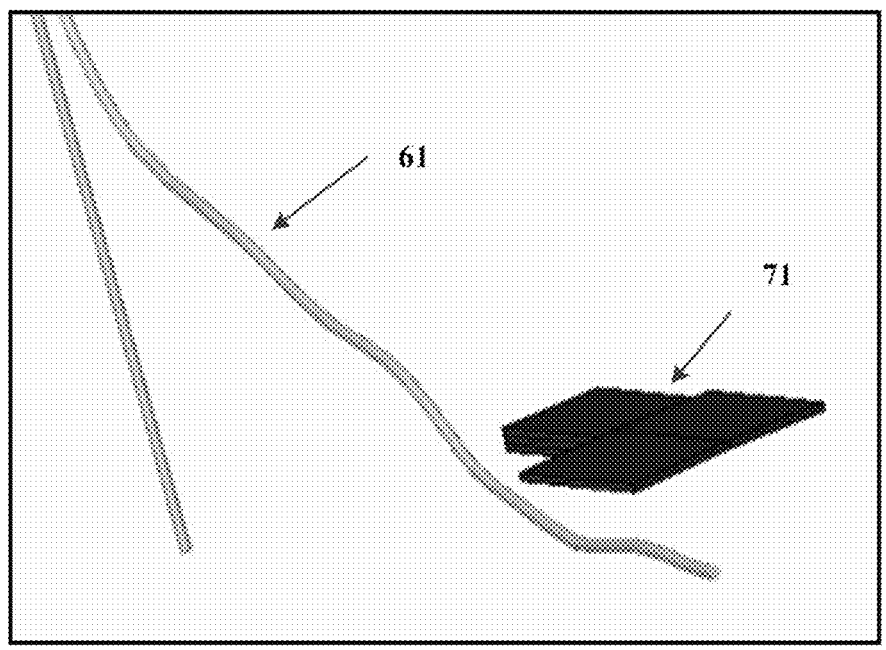
FIG. 7 is a graphic illustrating a well trajectory shown substantially aligned with an assigned grid having a perforation event according to an embodiment of the present invention.

Referring to FIG. 7, the process/tool can also or alternatively verify well trajectories 61 are correctly located by verifying intersection with the location of assigned grids 71, e.g., perforation events (block 27, FIG. 1). According to the exemplary configuration, the well trajectories 61 should intersect. Additionally, the tool can display all the trajectories 61 that do not intersect with grids 71 having perforation events in three dimensions, and in timely manner.

Figure 8:
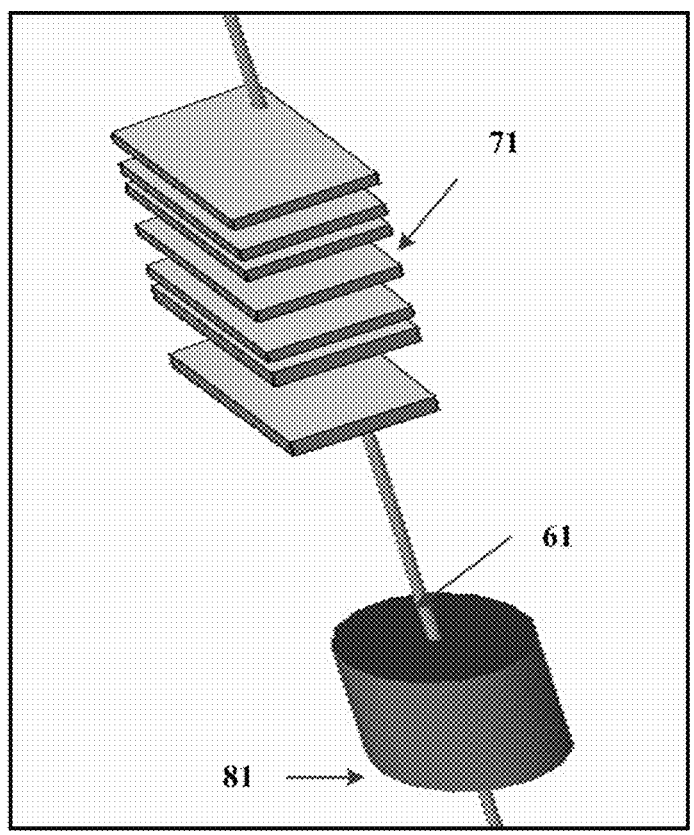
FIG. 8 is a graphic illustrating that a well completion is substantially correctly located by verifying whether or not they share the same depth zone according to an embodiment of the present invention.

Referring to FIG. 8, the process/tool can also or alternatively verify well completions 81 are correctly located by verifying they share the same depth zone as the assigned perforation events 71 (block 28, FIG. 1). Additionally, according to the exemplary embodiment, the tool can display all well completion events 81 that do not intersect with associated perforation events 71.

Figure 9:
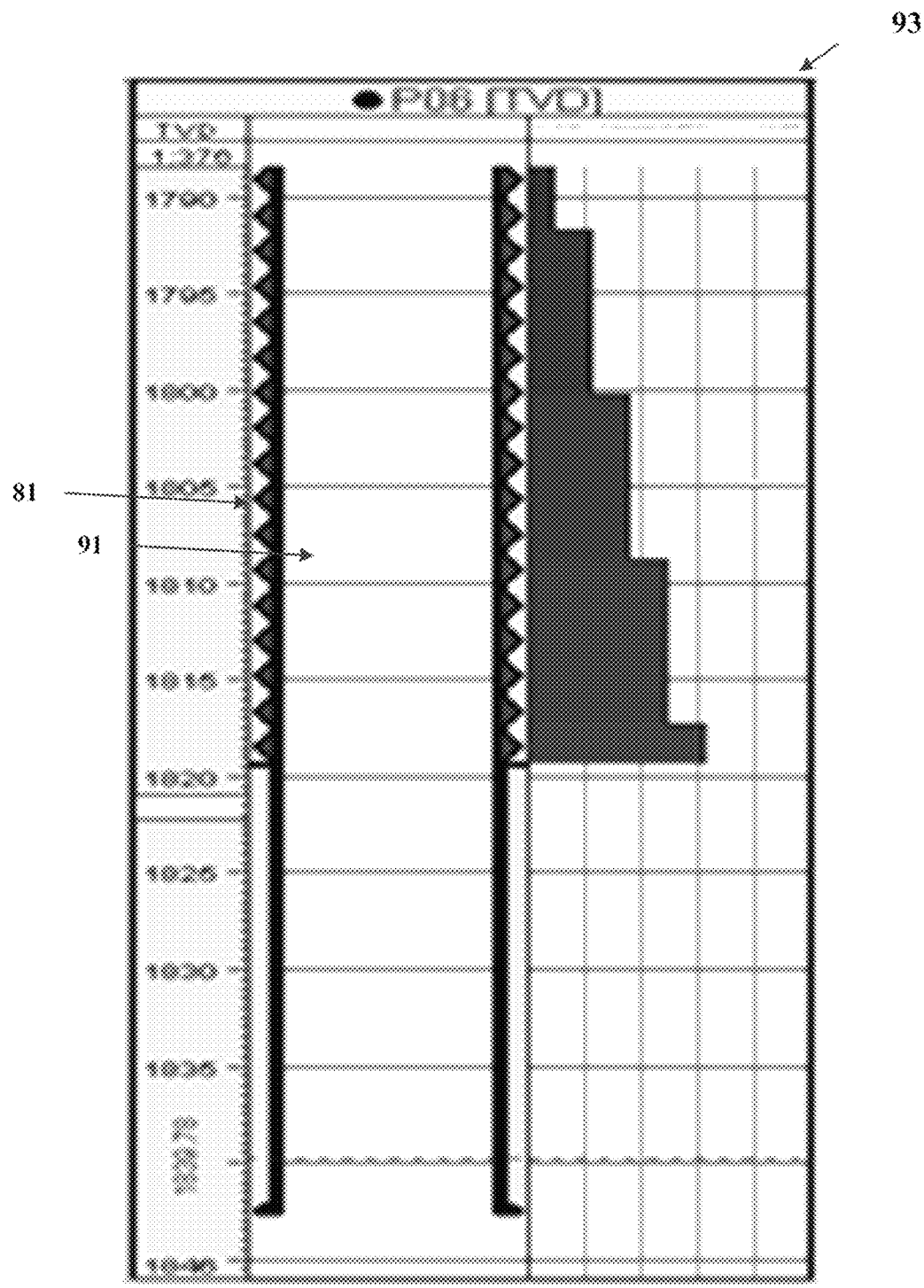
FIG. 9 is a graphic illustrating a well completion is substantially correctly located by comparing its location with a certain well log depth zone associated with well log data according to an embodiment of the present invention.

Referring to FIG. 9, the process/tool can also or alternatively verify well completions 81 are correctly located by comparing their location with a certain well log depth zone 91 associated with well log data 93 (illustrated graphically in FIG. 9) indicating a well completion 81 (block 29, FIG. 1). Specifically, according to the exemplary configuration, the tool can check if the well completions events 81 are located correctly by comparing them against production logging tool (PLT) wells logs. The well completions events 81 should honor the PLT depth zone 91 within selected (e.g., preselected) tolerances or other criteria as understood by one of ordinary skill in the art. The tolerances can be based on a discrete depth, range of depth values, or a depth zone 91, provided by the simulation engineer. The tool can also list and display all the wells with issues, to include those having locations out of the tolerance limit.

Figure 10A:
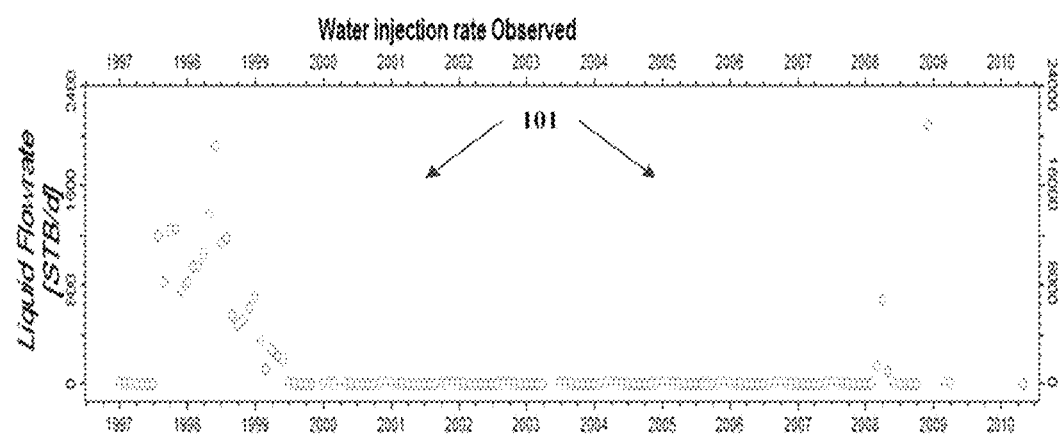
FIG. 10A is a graphic illustrating observed liquid flow rates for a well according to an embodiment of the present invention.
Figure 10B:
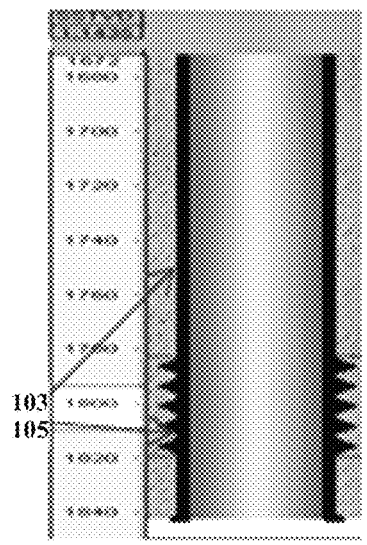
FIG. 10B is a graphic illustrating a perforation well coinciding with anticipation of an observed positive liquid flow rate for a well associated with FIG. 10A according to an embodiment of the present invention.
Figure 10C:
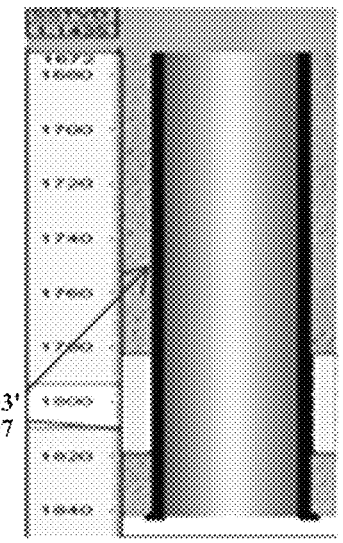
FIG. 10C is a graphic illustrating a cemented-in well coinciding with anticipation of no observed liquid flow rate for the well associated with FIG. 10A according to an embodiment of the present invention.

Referring to FIG. 10A-10C, the process/tool can also or alternatively validate well completion events 81 temporally with observed data 101, such as, for example, liquid flow rate data (block 30, FIG. 1). According to the exemplary configuration, the tool can first check the opening and closure of wells 103 for production against the observed data measurement 101. The tool can also issue messages with a well's name and corresponding error, e.g., flowing wells without open flow section, completed wells without flow rate, if there is a mismatch between expected and observed conditions. FIG. 10A provides a graphic illustrating liquid flow rate per quarter year. A perforated well such as, for example, the well 103 shown in FIG. 10B, having an open flow section 105 will be expected to have a positive liquid flow rate. If indicating no flow, this would be a mismatch. FIG. 10C illustrates a closed well 103' without an open flow section, e.g., cemented in section 107. A positive flow rate would be identified as an error.

Figure 11:
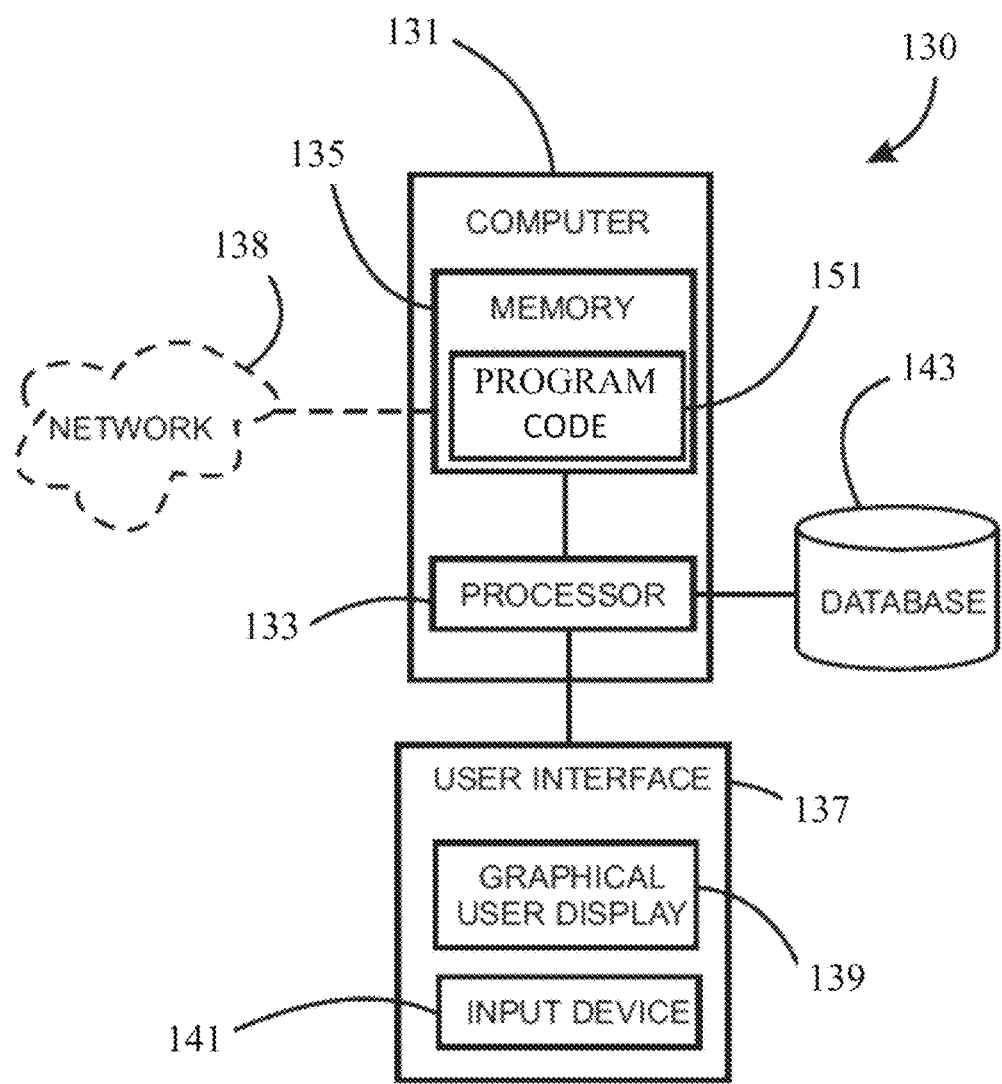
FIG. 11 is a schematic diagram illustrating an apparatus for performing well completion and reservoir grid data quality assurance for a reservoir simulation according to an embodiment of the present invention.

FIG. 11 illustrates an apparatus 130 for providing automated well completion and reservoir grid data quality assurance for a reservoir simulation. The apparatus 130 can include a data quality analyzing machine 131 having a processor 133, memory 135 coupled to the processor 133 to store software and database records therein, and a user interface 137 that can include a graphical display 139 for displaying graphical images, and a user input device 141 as known to those skilled in the art, to provide a user access to manipulate the software and database records. Note, the machine 131 can be in the form of a personal computer or in the form of a server or multiple servers serving multiple user interfaces 137. Therefore, according to an embodiment of the invention, the machine 131 can comprise a server. Accordingly, the user interface 137 can be either directly connected to the machine 131 or through a network 138 as known to those skilled in the art. For example, the user interface 137 can be the user interface of a remote computing device connected to the machine 131 via the Internet, a Local Area Network or another suitable network 138 as known to those skilled in the art.

The apparatus 130 can also include one or more tables and/or databases 143 stored in memory (internal or external) that is operably coupled to the data quality analyzing machine 131, as would be understood by those skilled in the art. The one or more databases 143 can include the simulation grids 31, which should be available at the beginning of the study for use in validating the grid index order and grid location and to allow highlighting of simulation grids 31. The one or more databases 143 can also include well tops location for use in validating the grid horizons 41 against the well tops 43. The one or more databases 143 can also include grid fault data and interpreted fault lines data for use in validating the position/orientation of the grid fault lines 53 against the position/orientation of the interpreted fault lines 51. The one or more databases 143 can also include data regarding the position of the well trajectories for use in verifying the well trajectories are correctly located. The one or more databases 143 can also include perforation and well completion events data for use in verifying well trajectories 61 and well completions 81 are correctly located. The one or more databases 143 can also include logging tool (PLT) data 93 for use in verifying well completions are correctly located. The one or more databases 143 can also include observed liquid flow rate data 101 for use in validating well completion events 81.

The apparatus 130 can also include data quality analyzing program 151 stored in memory 135 of the data quality analyzing machine 131 and including instructions that when executed by the data quality analyzing machine 131, causes the machine 131 to perform quality control and crosschecking steps on well completion and reservoir data used in building reservoir simulation models to eliminate inconsistencies and problems during the history match process. Note, the data quality analyzing program 151 can be in the form of microcode, programs, routines, and symbolic languages that provide a specific set or sets of ordered operations that control the functioning of the hardware and direct its operation, as known and understood by those skilled in the art. Note also, the data quality analyzing program 151, according to one or more of the embodiments of the present invention, need not reside in its entirety in volatile memory, but can be selectively loaded, as necessary, according to various methodologies as known and understood by those skilled in the art.

As described in more detail above, various embodiments of the machine 131, program code 151 and above methods provide a substantial improvement to an existing technology. For example, one or more embodiments cause the machine 131 to perform the operations of: validating the grid index order of grids used in modeling a reservoir by validating the grid cell number assignment of the reference grid; validating the grid location by comparison of its physical location with a well-known location of a well; and validating the grid horizons against well tops, which mark the depth of the upper boundary of the geological layer, to ensure correct modeling of the grid horizons. The operations can also include validating grid fault position/orientation against the position/orientation of interpreted fault lines to ensure that the grid faults are modeled correctly. The grid fault boundaries should intersect interpreted fault lines. The operations additionally include identifying and highlighting grids having issues with either cell angle, sell bulk volume, cell volume contrast, and flipped cells, that significantly negatively impact simulation convergence and simulation computing time; verifying well trajectories are correctly located by comparing them with corresponding well top locations (e.g., typically three); verifying well trajectories are correctly located by verifying intersection with location of assigned perforation events; verifying well completions are correctly located by verifying they share the same depth zone as the assigned perforation events; verifying well completions are correctly located by comparing their location with a certain well log depth zone associated with well log data indicating a well completion; and/or validating well completion events temporally with observed liquid flow rate data.

Figure 12:
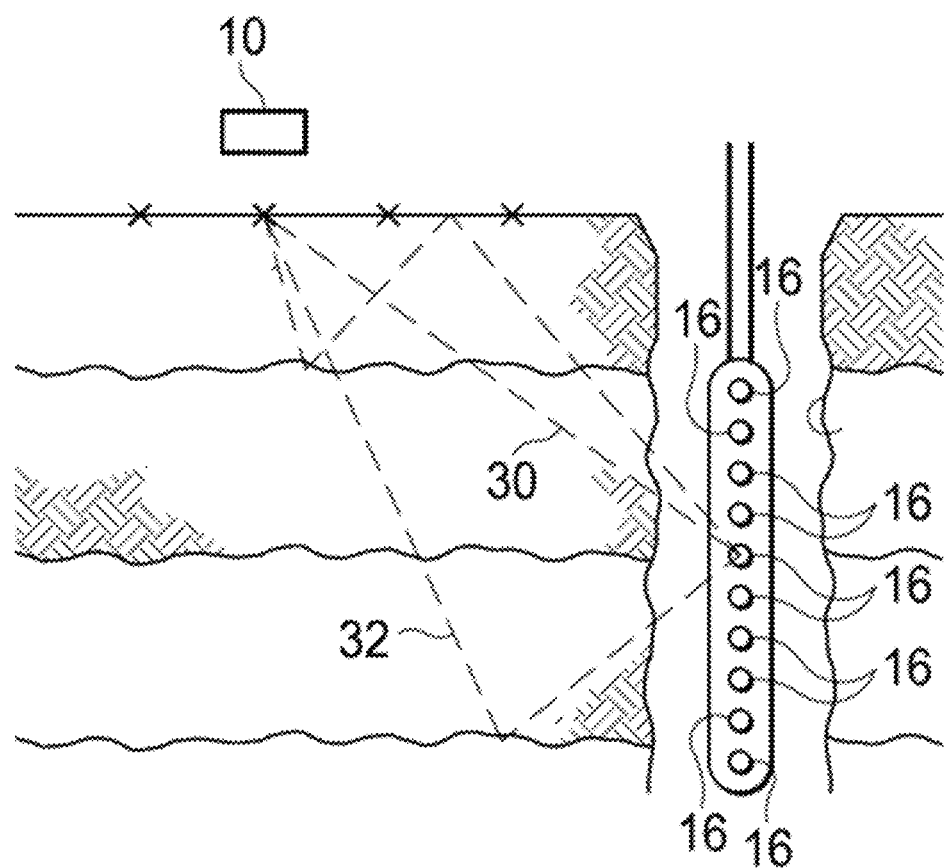
FIG. 12 is a graphic illustrating a seismic wave generator and seismic wave receivers according to an embodiment of the present invention.

One skilled in the art would understand that the various functions described may be carried out by dedicated modules. For example, embodiments include a machine 131 comprising one or more processors 133 and tangible computer-readable medium 135, the machine 131 being adapted to communicate with one or more remote computing devices operably connected to one or more displays 139, the tangible computer-readable medium 135 having stored therein a set of instructions that when executed by the one or more processors 133 cause the one or more processors 133 to initiate a plurality of modules thereby to create reservoir data and to transform reservoir data so as to simulate a three-dimensional (3D) reservoir model on the one or more displays 139. The plurality of modules can include a seismic survey module responsive to one or more seismic wave generators 10 and one or more seismic wave receivers 16 and configured to process seismic survey data. The one or more seismic wave generators 10 can be deployed in operable proximity to a known or potential reservoir location and generate seismic waves as illustrated in FIG. 12 according to an embodiment of the invention. These seismic wave generators 10 can include explosives, vehicle-mounted weights, or other seismic wave generators as known by those skilled in the art. Embodiments can also rely on naturally occurring seismic events to generate seismic waves. In addition, the one or more seismic wave receivers 16 can be deployed in operable proximity to a known or potential reservoir location and compile seismic survey data in the form of received seismic waves 30, 32. Exemplary seismic wave receivers 16 include geophones and hydrophones, though one skilled in the art would understand that other seismic wave receivers can be used. Received seismic waves 30, 32 are typically reflected or refracted waves generated by the seismic wave generators 10. The seismic survey module can be configured to process the seismic survey data thereby to convert the seismic survey data into reservoir data associated with the reservoir. The reservoir data can include well top location data, grid horizon data, and well trajectory position data. The plurality of modules can also include a well top location module responsive to the reservoir data and configured to access well top location data describing a well top location 43 of each of a plurality of well tops for a reservoir simulation model. In addition, the plurality of modules can include a well trajectory position module responsive to the reservoir data and configured to access well trajectory position data describing a well trajectory position of each of a plurality of well trajectories 61.

Advantageously, the plurality of modules can include a grid horizon automated validation module responsive to the seismic survey module and the well top location module and configured to perform an automated validation of a grid horizon location 41 of each of a plurality of grid horizons against the well top location 43 of one or more of the plurality of well tops associated with the respective grid horizon 41, the well top location 43 of respective associated one or more well tops 43 identifying depth of a geological layer corresponding with the respective grid horizon 41, the automated validation of the grid horizon location 41 of each of the plurality of grid horizons comprising comparing the grid horizon location 41 with the well top location 43 of each respective associated one or more well tops for each of the plurality of grid horizons to ensure correct modeling of the plurality of grid horizons.

Advantageously, the plurality of modules can include a well trajectory automated verification module responsive to the seismic survey module, the well top location module, and the well trajectory position module and configured to perform an automated verification of the well trajectory position of each of the plurality of well trajectories 61 against the well top locations 43 of a set of at least two of the plurality of well top locations 43 associated with the respective well trajectory 61. In embodiments, each well top location 43 can define an entry position of an associated well of a plurality of wells through a corresponding geologic layer, and each set of at least two well top locations 43 can define the well trajectory position of the well trajectory 61 of the associated well extending therebetween. The automated verification of the well trajectory position of each of the plurality of well trajectories can comprise comparing the well trajectory position with the well top locations 43 of each of the respective associated set of at least two well top locations 43 for each of the plurality of well trajectories 61 thereby to ensure the plurality of well trajectories 61 are correctly located.

The resulting simulation may be executed by a reservoir simulation module. The reservoir simulation module can be responsive to the reservoir data, the grid horizon automated validation module, and the well trajectory automated verification module and configured to integrate the reservoir data, grid horizons 41, and well trajectories 61 thereby to simulate a 3D reservoir model on the one or more displays 139.

In embodiments, the grid horizon automated validation module can be further configured to identify and highlight each of the plurality of well tops having their respective well top location 43 being separated from the grid horizon location 41 corresponding therewith by more than a preselected tolerance, and the well trajectory automated verification module can be further configured to identify and highlight each of the plurality of well trajectories 61 having their respective well trajectory position being separated from a trajectory extending through the at least two well top locations 43 corresponding therewith by more than a preselected tolerance.

Advantageously, the reservoir data can include grid perforation location data describing a grid perforation location of each of a plurality of grid perforation events 71. Moreover, the plurality of modules can further include a grid perforation module responsive to the reservoir data and the reservoir simulation module and configured to perform an automated verification of the well trajectory position of each of the plurality of well trajectories 61 against the grid perforation location of one or more associated grid perforation events 71 of the plurality of grid perforation events 71. Each grid perforation event 71 can identify a location of a portion of an associated well of the plurality of wells. The automated verification of the well trajectory position of each of the plurality of well trajectories 61 can comprise comparing the well trajectory position with the grid perforation location of an associated one of the plurality of perforation events 71 for each of the plurality of well trajectories 61 thereby to ensure that the plurality of well trajectories are correctly located. The grid perforation module can be further configured to identify and highlight each of the plurality of well trajectories 61 that do not intersect with the respective grid perforation event 71 associated therewith.

In embodiments, the reservoir data can further include grid perforation location data describing a grid perforation location of each of a plurality of grid perforation events 71 for each of the plurality of wells and well completion event data describing a well completion event 81 location of each of the plurality of well completions for each of the plurality of wells, and production logging tool data describing production zone information for each of the plurality of wells. In addition, the plurality of modules can further include a well completion event module responsive to the reservoir data and the reservoir simulation module and configured to perform an automated verification of the well completion event 81 location of each of the plurality of well completions against the grid perforation location of at least one associated grid perforation event of the plurality of grid perforation events 71, the grid perforation location data containing respective associated depth zone identification for each of the plurality of grid perforation events 71, and the well completion event data containing respective associated depth zone identification for each of the plurality of well completions. The automated verification of the well completion event location of each of the plurality of well completions can comprise comparing the depth zone of the well completion event 81 for a respective associated well of the plurality of wells with the depth zone of the grid perforation event 71 for the respective associated well for each of the plurality of well completions thereby to ensure that each of the well completion events 81 are correctly located. Further, the well completion event module can be configured to identify and highlight each of the plurality of well completions that do not intersect with the respective grid perforation event 71 associated therewith.

In embodiments, the reservoir data can further include well completion event location data describing the well completion event 81 location of each of a plurality of well completions for each of the plurality of wells, and production logging tool data describing production zone information for each of the plurality of wells. In embodiments of the machine 131, the plurality of modules can further include a well completion event module responsive to the reservoir data and the reservoir simulation module and configured to perform an automated verification of the well completion event location of each of the plurality of well completions against the production logging tool data. The well completion location data can identify one or more depth zones for each of the plurality of well completions, and the production logging tool data can contain saturation information for each of a plurality of consecutive well log depth zones for each of the plurality of wells. The automated verification of the well completion event location of each of the plurality of well completions can comprise comparing the one or more depth zones of the well completion event 81 of one of the wells with the well log depth zones for the corresponding well having a saturation level indicating existence of a flowing production zone, performed for each of the plurality of wells thereby to ensure that the well completion location for each of the plurality of wells honors related production logging tool data.

In embodiments, the reservoir data can further include observed liquid flow rate data describing liquid flow rate measurements for each of a plurality of time periods for each of the plurality of wells, and well open and closure data describing the times each of the plurality of wells opens and closes for production. In embodiments of the machine 131, the plurality of modules can further include a well completion event module responsive to the reservoir data and the reservoir simulation module and configured to perform an automated temporal validation of the plurality of well completion events against observed liquid flow rate data. The automated temporal validation of the plurality of well completion events 81 can comprise comparing times of opening and closure of each of the plurality of wells for production with liquid flow rate measurements taken between the respective times of opening and closure of the respective well for production for each of the plurality of wells thereby to ensure that the well completion events 81 are correctly assigned.

In embodiments, the reservoir data can further include modeled grid fault line data describing modeled grid fault line positioning for each of a plurality of grid faults, and interpreted grid fault line data describing interpreted grid fault line positioning for each of the plurality of grid faults. In embodiments of the machine 131, the plurality of modules further includes a grid fault line positioning module responsive to the reservoir data and the reservoir simulation module and configured to perform an automated validation of modeled grid fault line positioning against interpreted grid fault line positioning. The automated validation of the model grid fault line positioning can comprise comparing the modeled grid fault line positioning with the interpreted grid fault line positioning for each of the plurality of grid faults to determine whether the respective modeled grid fault line 53 intersects its corresponding interpreted grid fault line thereby to ensure that the plurality of grid faults are correctly modeled. The grid fault line positioning module can be further configured to identify and highlight each of the plurality of grid faults having their respective grid fault line positioning being separated from the interpreted grid fault line positioning therewith by more than a preselected tolerance.

In embodiments, the reservoir data further can include simulation grid cell data describing three-dimensional grid cell number assignments for each of a plurality of stimulation grid cells. In embodiments of the machine 131, the plurality of modules further can include a grid cell highlighting module responsive to the reservoir data and the reservoir simulation module and configured to perform an automated identification and highlighting of each of the plurality of simulation grid cells having out of tolerance cell attributes that negatively impact simulation convergence and simulation computing time. For example, the automated identification and highlighting can identify and highlight simulation grid cells having out of tolerance cell attributes that impact convergence and simulation computing time by more than a certain percentage. The cell attributes can comprise a plurality of the following: cell angle, cell bulk volume, cell volume contrast, and flipped cells.

In embodiments of the machine 131, the plurality of modules further can include a grid cell location module responsive to the reservoir data and the reservoir simulation module and configured to perform an automated validation of grid cell location against the well-known location of one or more of the plurality of wells. The simulation grid cell data can include a modeled location of each of the plurality of simulation grid cells, the automated validation of the grid cell locations comprising comparing the modeled simulation grid cell location with the well-known location of one or more of the plurality of wells performed for each of the plurality of simulation grid cells to ensure proper grid cell positioning.

In embodiments, the reservoir data further can include simulation grid cell data describing three-dimensional grid cell number assignments for each of a plurality of simulation grid cells. In embodiments of the machine 131, the plurality of modules further can include a simulation grid index module responsive to the reservoir data and the reservoir simulation module and configured to perform an automated validation of simulation grid index order. The automated validation of simulation grid index order can comprise comparing the three-dimensional grid cell number assignment of the top left simulation grid cell of the model with a reference grid cell assignment number.

In addition, it is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that various embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions, with the exception of those considered to be non-statutory subject matter, presently a propagating signal per se. Such media can contain, for example, both operating instructions and the operations instructions related to the program code 151, and the computer executable portions of the method steps according to the various embodiments of methods of perform quality control and crosschecking steps on well completion and reservoir data used in building reservoir simulation models, among others, described above.

The present application is a non-provisional application which claims priority to and the benefit of U.S. Provisional Application No. 61/921,943, filed on Dec. 30, 2013 and titled "Automated Well Completions and Reservoir Grid Data Quality Assurance Methods For Reservoir Simulation," and U.S. Provisional Application No. 61/921,966, filed on Dec. 30, 2013 and titled "Automated Well Completions and Reservoir Grid Data Quality Assurance Apparatus and Computer Readable Medium For Reservoir Simulation," the disclosures both of which are incorporated herein in their entireties. This application is also related to U.S. patent application Ser. No. 14/584,665, titled "Machines For Reservoir Simulation With Automated Well Completions and Reservoir Grid Data Quality Assurance" and filed this same day, the contents of which are incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A method of creating reservoir data and simulating a reservoir model with quality control and crosschecking of reservoir data, the method comprising the steps of:
    physically positioning a plurality of seismic wave generators at a surface location in operable proximity to a reservoir location, the plurality of seismic wave generators configured to generate seismic waves;
    physically positioning a plurality of seismic wave receivers in a wellbore in operable proximity to the reservoir location, the plurality of seismic wave receivers configured to compile seismic survey data in the form of received seismic waves;
    generating, by the plurality of seismic wave generators, one or more seismic waves; and
    a computer performing the following operations:
    compiling, by the plurality of seismic wave receivers, seismic survey data responsive to waves received by the plurality of seismic wave receivers;
    processing the seismic survey data thereby to convert the seismic survey data into reservoir data, the reservoir data including at least well top location data comprising a well top location of each well top of a plurality of well tops, grid horizon data comprising a grid horizon location of each grid horizon of a plurality of grid horizons, and well trajectory position data comprising a well trajectory position of each well trajectory of a plurality of well trajectories;
    accessing the well top location data, the grid horizon data, and the well trajectory position data;
    performing, for each grid horizon of the plurality of grid horizons, an automated validation of a grid horizon location of the grid horizon against the well top location of one or more of the plurality of well tops associated with the grid horizon, the well top location of each of the associated one or more well tops identifying depth of a geological layer corresponding with the grid horizon, the automated validation of the grid horizon location of the grid horizon comprising comparing the grid horizon location with the well top location of each of the associated one or more well tops to determine whether one or more of the plurality of well tops associated with the grid horizon has a location that is not within a first threshold distance of the grid horizon location;
    identifying non grid horizon intersecting well tops comprising one or more well tops of the plurality of well tops having a location that is not within the first threshold distance of an associated grid horizon location;
    providing an indication of the non grid horizon intersecting well tops;
    performing, for each of the plurality of well trajectories, an automated verification of the well trajectory position of the well trajectory against the well top locations of a set of at least two of the plurality of well top locations associated with the well trajectory, each well top location identifying an entry position of an associated well of a plurality of wells through a corresponding geologic layer, the automated verification of the well trajectory position of the well trajectory comprising comparing the well trajectory position with the well top locations of each well top location of the set of at least two of the plurality of well top locations for the well trajectory to determine whether the well trajectory position is separated from a trajectory extending between the well top locations of the set of at least two of the plurality of well top locations by at least a second threshold distance;

identifying invalid well trajectories comprising one or more of the plurality of well trajectories having a well trajectory position separated from the trajectory extending between the well top locations of the set of at least two of the plurality of well top locations associated with the well trajectory by at least the second threshold distance;

providing an indication of the invalid well trajectories;

generating a 3D reservoir model by integrating the reservoir data, the plurality of grid horizons and the plurality of well trajectories;

displaying the 3D reservoir model to simulate a reservoir, and producing hydrocarbons from the reservoir based on the 3D reservoir model.

2. A computer-implemented method as defined in claim 1, wherein providing an indication of the non grid horizon intersecting well tops comprises providing a display visibly highlighting the non grid horizon intersecting well tops.

3. A computer-implemented method as defined in claim 1, wherein providing an indication of the invalid well trajectories comprises providing a display visibly highlighting the invalid well trajectories.

4. The method as defined in claim 1,
receiving the well trajectory position data and grid perforation location data describing a grid perforation location of each of a plurality of grid perforation events; and
performing an automated verification of the well trajectory position of the each of the plurality of well trajectories against the grid perforation location of one or more associated grid perforation events of the plurality of grid perforation events, each grid perforation event identifying a location of a portion of an associated well of the plurality of wells, the automated verification of the well trajectory position of each of the plurality of well trajectories comprising comparing the well trajectory position with the grid perforation location of an associated one of the plurality of perforation events for each of the plurality of well trajectories to identify whether an intersection exists between the well trajectory position and the grid perforation location of the associated one of the plurality of perforation events for each of the plurality of well trajectories to ensure that plurality of well trajectories are correctly located.

5. The method as defined in claim 4, wherein the automated verification of the well trajectory position of each of the plurality of well trajectories further comprises the step of:
identifying each of the plurality of well trajectories that do not intersect with the respective grid perforation event associated therewith.

6. The method as defined in claim 1,
receiving grid perforation location data describing a grid perforation location of each of a plurality of grid perforation events for each of the plurality of wells, and well completion events data describing a well completion event location of each of a plurality of well completions for each of the plurality of wells; and
performing an automated verification of the well completion event location of each of the plurality of well completions against the grid perforation location of at least one associated grid perforation event of the plurality of grid perforation events, the grid perforation location data containing respective associated depth zone identification for each of the plurality of grid perforation events, the well completion events data containing respective associated depth zone identification for each of the plurality of well completions, the automated verification of the well completion event location of each of the plurality of well completions comprising comparing the depth zone of the well completion event for a respective associated well of the plurality of wells with the depth zone of the grid perforation event for the respective associated well for each of the plurality of well completions to identify whether an intersection exists between the depth zone of the well completion event for the respective associated well of the plurality of wells and the depth zone of the grid perforation event for the respective associated well for each of the plurality of well completions to ensure that each of the well completion events are correctly located.

7. The method as defined in claim 6, wherein the automated verification of the well completion event location of each of the plurality of well completions further comprises the step of:
identifying and highlighting each of the plurality of well completions that do not intersect with the respective grid perforation event associated therewith.

8. The method as defined in claim 1,
accessing well completion location data describing the well completion location of each of the plurality of well completions for each of the plurality of wells, and production logging tool data containing production zone information for each of the plurality of wells; and
performing an automated verification of the well completion event location of each of the plurality of well completions against the production logging tool data, the well completion location data identifying one or more depth zones for each of the plurality of well completions, the production logging tool data containing saturation information for each of a plurality of consecutive well log depth zones for each of the plurality of wells, the automated verification of the well completion event location of each of the plurality of well completions comprising comparing the one or more depth zones of the well completion event of one of the wells with the well log depth zones for the corresponding well having a saturation level indicating existence of a flowing production zone, performed for each of the plurality of wells to ensure that the well completion location for each of the plurality of wells honors related production logging tool data.

9. The method as defined in claim 1,
accessing observed liquid flow rate data and well opening and closing for production data for the plurality of wells; and
performing an automated temporal validation of the plurality of well completion events against observed liquid flow rate data, the observed liquid flow rate data including liquid flow rate measurements for each of a plurality of time periods for each of the plurality of wells, the automated temporal validation of the plurality of well completion events comprising comparing times of opening and closure of each of the plurality of wells for production with liquid flow rate measurements taken between the respective times of opening and closure of the respective well for production for each of the plurality of wells to identify whether positive liquid flow rate measurements correspond to times of opening of each of the plurality of wells and non-positive liquid flow rate measurements correspond to times of closure of each of the plurality of wells to ensure that the well completion events are correctly assigned.

10. The method as defined in claim 1,
accessing modeled grid fault lines data and interpreted grid fault lines data for each of one or more grid fault lines; and
performing an automated validation of modeled grid fault line positioning against interpreted grid fault line positioning, the modeled grid fault lines data describing modeled grid fault line positioning for each of a plurality of grid faults, the interpreted grid fault lines data describing interpreted grid fault line positioning for each of the plurality of grid faults, the automated validation of the model grid fault line positioning comprising comparing the modeled grid fault line positioning with the interpreted grid fault line positioning for each of the plurality of grid faults to determine whether or not the respective modeled grid fault line intersects its corresponding interpreted grid fault line to ensure that the plurality of grid faults are correctly modeled.

11. The method as defined in claim 10, wherein the automated validation of the model grid fault line positioning further comprises the step of:
identifying each of the plurality of grid faults having their respective grid fault line positioning being separated from the interpreted grid fault line positioning corresponding therewith by more than a preselected tolerance.

12. The method as defined in claim 1, further comprising the steps of:
accessing simulation grid cell data for each of a plurality of simulation grid cells; and
performing an automated identification and highlighting of each of the plurality of simulation grid cells having out of tolerance cell attributes that significantly negatively impact simulation convergence and simulation computing time, the cell attributes comprising a plurality of the following: cell angle, cell bulk volume, cell volume contrast, and flipped cells.

13. The method as defined in claim 1, further comprising the steps of:
accessing simulation grid cell data for each of a plurality of simulation grid cells, and a well-known location of one or more of the plurality of wells; and
performing an automated validation of grid cell location against the well-known location of one or more of the plurality of wells, the simulation grid cell data including a modeled location of each of the plurality of simulation grid cells, the automated validation of the grid cell locations comprising comparing the modeled simulation grid cell location with the well-known location of one or more of the plurality of wells performed for each of the plurality of simulation grid cells to ensure proper grid cell positioning.

14. The method as defined in claim 1, further comprising the steps of:
receiving simulation grid cell data for each of a plurality of simulation grid cells; and
performing an automated validation of simulation grid index order, the simulation grid cell data including three-dimensional grid cell number assignments, the automated validation of simulation grid index order comprising comparing the three-dimensional grid cell number assignment of the top left simulation grid cell of the model with a reference grid cell assignment number.

15. A method of creating reservoir data and simulating a reservoir model with quality control and crosschecking of reservoir data, the method comprising the steps of:
physically positioning a plurality of seismic wave generators at a surface location in operable proximity to a reservoir location, the plurality of seismic wave generators configured to generate seismic waves;
physically position a plurality of seismic wave receivers in a wellbore in operable proximity to the reservoir location;
generating, by the plurality of seismic wave generators, one or more seismic waves; and
a computer performing the following operations:
compiling, by the plurality of seismic wave receivers, seismic survey data responsive to waves received by the plurality of seismic wave receivers;
processing the seismic survey data thereby to convert the seismic survey data into reservoir data, the reservoir data including at least well top location data describing a well top location of each well top of a plurality of well tops for a reservoir simulation model, grid horizon data comprising a grid horizon location of each grid horizon of a plurality of a plurality of grid horizons, and well trajectory position data describing a well trajectory position of each well trajectory of a plurality of well trajectories;
accessing the well top location data, the well trajectory position data, modeled grid fault lines data and interpreted grid fault lines data for each of one or more grid fault lines, simulation grid cell data for each of a plurality of simulation grid cells, grid perforation location data describing the grid perforation location of each of the plurality of grid perforation events for each of a plurality of wells, and well completion events data describing a well completion event location of each of a plurality of well completions for each of the plurality of wells;
performing, for each grid horizon of the plurality of grid horizons, an automated validation of the grid horizon location of the grid horizon against the well top location of one or more of the plurality of well tops associated with the grid horizon, the well top location of each of the associated one or more well tops identifying depth of a geological layer corresponding with the grid horizon, the automated validation the grid horizon location of the grid horizon comprising comparing the grid horizon location with the well top location of each of the associated one or more well tops to determine whether one or more of the plurality of well tops associated with the grid horizon has a location that is not within a first threshold distance of the grid horizon location;
identifying non grid horizon intersecting well tops comprising one or more well tops of the plurality of well tops having a location that is not within the first threshold distance of an associated grid horizon location;
providing an indication of the non grid horizon intersecting well tops;
performing an automated validation of modeled grid fault line positioning against interpreted grid fault line positioning, the modeled grid fault lines data describing modeled grid fault line positioning for each of a plurality of grid faults, the interpreted grid fault lines data describing interpreted grid fault line positioning for each of the plurality of grid faults, the automated validation of the modeled grid fault line positioning comprising comparing the modeled grid fault line positioning with the interpreted grid fault line positioning for each of the plurality of grid faults to determine whether or not the respective modeled grid fault line intersects its corresponding interpreted grid fault line to ensure that the plurality of grid faults are correctly modeled;

performing an automated identification of each of the plurality of simulation grid cells having out of tolerance cell attributes that significantly negatively impact simulation convergence and simulation computing time, the cell attributes comprising a plurality of the following: cell angle, cell bulk volume, cell volume contrast, and flipped cells;

performing, for each of the plurality of well trajectories, an automated verification of the well trajectory position of the well trajectory against the well top locations of a set of at least two of the plurality of well top locations associated with the well trajectory, each well top location identifying an entry position of an associated well of the plurality of wells through a corresponding geologic layer, the automated verification of the well trajectory position of the well trajectory comprising comparing the well trajectory position with the well top locations of each of the respective associated set of at least two of the plurality of well top locations for the well trajectory to determine whether the well trajectory position is separated from a trajectory extending between the well top locations of the set of at least two of the plurality of well top locations by at least a second threshold distance;

identifying invalid well trajectories comprising one or more of the plurality of well trajectories having a well trajectory position separated from the trajectory extending between the well top locations of the set of at least two of the plurality of well top locations associated with the well trajectory by at least the second threshold distance;

providing an indication of the invalid well trajectories;

performing an automated verification of the well trajectory position of the each of the plurality of well trajectories against the grid perforation location of one or more associated grid perforation events of the plurality of grid perforation events, each grid perforation event identifying a location of a portion of an associated well of the plurality of wells, the automated verification of the well trajectory position of the each of the plurality of well trajectories against the grid perforation locations comprising comparing the well trajectory position with the grid perforation location of an associated perforation events for each of the plurality of well trajectories to identify whether an intersection exists between the well trajectory position and the grid perforation location of the associated one of the plurality of perforation events for each of the plurality of well trajectories to ensure that plurality of well trajectories are correctly located;

performing an automated verification of the well completion event location of each of the plurality of well completions against the grid perforation location of at least one grid perforation event of the plurality of grid perforation events, the grid perforation location data containing respective associated depth zone identification of one or more associated depth zones for each of the plurality of grid perforation events, the well completion events data containing respective associated depth zone identification of one or more associated depth zones for each of the plurality of well completions, the automated verification of the well completion event location of each of the plurality of well completion comprising comparing at least one of the one or more depth zones of the well completion event for a respective associated well of the plurality of wells with at least one of the one or more depth zones of the grid perforation event for the respective associated well for each of the plurality of well completions to identify whether an intersection exists between the depth zone of the well completion event for the respective associated well of the plurality of wells and the depth zone of the grid perforation event for the respective associated well for each of the plurality of well completions to ensure that each of the well completion events are correctly located;

generating a reservoir model based on the validation of the grid horizon locations, the validation of modeled grid fault line positioning, the identification of the plurality of simulation grid cells having out of tolerance cell attributes that significantly negatively impact simulation convergence and simulation computing time, the verification of the well trajectory positions, and the verification of the well completion event locations; and producing hydrocarbons from the reservoir based on the reservoir model.

16. A computer-implemented method as defined in claim 15,
wherein the automated verification of the well trajectory position of each of the plurality of well trajectories against the grid perforation locations further comprises identifying each of the plurality of well trajectories that do not intersect with the respective grid perforation event associated therewith;
wherein the automated verification of the well completion event location of each of the plurality of well completions further comprises identifying each of the plurality of well completions that do not intersect with the respective grid perforation event associated therewith; and
wherein the automated validation of the model grid fault line positioning further comprises identifying each of the plurality of grid faults having their respective grid fault line positioning being separated from the interpreted grid fault line positioning corresponding therewith by more than a preselected tolerance.

17. A computer-implemented method as defined in claim 15, further comprising the steps of:
receiving the well completion events data, and production logging tool data containing production zone information for each of the plurality of wells;
performing an automated verification of the well completion event location of each of the plurality of well completions against the production logging tool data, the well completion events data identifying the respective one or more depth zones for each of the plurality of well completions, the production logging tool data containing saturation information for each of a plurality of consecutive well log depth zones for each of the plurality of wells, the automated verification of the well completion event location of each of the plurality of well completions against the production logging tool data comprising comparing the one or more depth zones of the well completion event of one of the wells with the well log depth zones for the corresponding well having a saturation level indicating existence of a flowing production zone, performed for each of the plurality of wells to ensure that the well completion location for each of the plurality of wells honors related production logging tool data.

18. A computer-implemented method as defined in claim 15, further comprising the steps of:
receiving observed liquid flow rate data, and well opening and closing for production data for the plurality of wells; and
performing an automated temporal validation of the plurality of well completion events against observed liquid flow rate data, the observed liquid flow rate data including liquid flow rate measurements for each of a plurality of time periods for each of the plurality of wells, the automated temporal validation of the plurality of well completion events comprising comparing times of opening and closure of each of the plurality of wells for production with liquid flow rate measurements taken between the respective times of opening and closure of the respective well for production for each of the plurality of wells to identify whether positive liquid flow rate measurements correspond to times of opening of each of the plurality of wells and non-positive liquid flow rate measurements correspond to times of closure of each of the plurality of wells, to ensure that the well completion events are correctly assigned.

19. A method of creating reservoir data and simulating a reservoir model with quality control and crosschecking of reservoir data, the method comprising the steps of:
physically positioning a plurality of seismic wave generators at a surface location in operable proximity to a reservoir location, the plurality of seismic wave generators configured to generate seismic waves;
physically positioning a plurality of seismic wave receivers in a wellbore in operable proximity to the reservoir location, the plurality of seismic wave receivers configured to compile seismic survey data in the form of received seismic waves;
generating, by the plurality of seismic wave generators, one or more seismic waves; and
a computer performing the following operations:
compiling, by the plurality of seismic wave receivers, seismic survey data responsive to waves received by the plurality of seismic wave receivers;
processing the seismic survey data thereby to convert the seismic survey data into reservoir data, the reservoir data including at least well top location data, grid horizon data, well trajectory position data;
validating a grid index order of grids used in modeling a reservoir by validating an associated grid cell number assignment of a reference grid;
validating a grid location by comparison of its location with a well-known location of a well;
validating a grid horizon by, for each of one or more well tops associated with the grid horizon, determining whether a portion of the grid horizon is within a first threshold distance of a location of the well top;
validating a well trajectory for a well by:
for each of two well tops associated with the well, determining whether a portion of the well trajectory is within a second threshold distance of a location of the well top; and
for each of one or more grid perforations associated with the well, determining whether the grid perforation intersects a portion of the well trajectory;
validating a model grid fault line by determining whether a location of the modeled grid fault is within a third threshold distance of the location of an interpreted fault line;
identifying and highlighting grids having issues with either cell angle, cell bulk volume, cell volume contrast, or flipped cells, that significantly negatively impact simulation convergence and simulation computing time;
validating a well completion for a well by determining whether a depth zone of the completion intersects a depth zone of a perforation associated with the well and a location of the well completion indicated by well log data for the well; and
validating a well completion event temporally by determining whether observed liquid flow rate data corresponds to opening or closing events of the well completion event
generating a reservoir model based on the validation of the grid index order of grids, the grid location, the grid horizon, the well trajectory, the well completion and the well completion event; and
producing hydrocarbons from the reservoir based on the reservoir model.

* * * * *

UNITED STATES PATENT AND TRADEMARK OFFICE
CERTIFICATE OF CORRECTION

PATENT NO. : 10,054,712 B2
APPLICATION NO. : 14/584184
DATED : August 21, 2018
INVENTOR(S) : Al-Nuaim et al.

It is certified that error appears in the above-identified patent and that said Letters Patent is hereby corrected as shown below:

In the Claims

In Column 22, Line 11, Claim 15, the claim language reads:
"position"
It should read:
--positioning--

Signed and Sealed this
Ninth Day of October, 2018

Andrei Iancu
*Director of the United States Patent and Trademark Office*